(12) United States Patent
Razzell

(10) Patent No.: US 8,265,180 B2
(45) Date of Patent: Sep. 11, 2012

(54) OFDM COGNITIVE RADIO WITH ZERO OVERHEAD SIGNALLING OF DELETED SUBCARRIERS FREQUENCIES

(75) Inventor: Charles Razzell, Pleasanton, CA (US)

(73) Assignee: NXP B.V., Eindhoven (NL)

( * ) Notice: Subject to any disclaimer, the term of this patent is extended or adjusted under 35 U.S.C. 154(b) by 1030 days.

(21) Appl. No.: 12/095,575

(22) PCT Filed: Nov. 30, 2006

(86) PCT No.: PCT/IB2006/054521
§ 371 (c)(1),
(2), (4) Date: May 30, 2008

(87) PCT Pub. No.: WO2007/063514
PCT Pub. Date: Jun. 7, 2007

(65) Prior Publication Data
US 2010/0165956 A1      Jul. 1, 2010

Related U.S. Application Data

(60) Provisional application No. 60/741,815, filed on Dec. 2, 2005.

(51) Int. Cl.
*H04K 1/10*   (2006.01)
*H04L 27/28*  (2006.01)
(52) U.S. Cl. .................................................... 375/260
(58) Field of Classification Search .................. 375/277, 375/260, 287, 299, 301, 346, E1.032, E1.036; 370/525, 346; 324/628; 342/367
See application file for complete search history.

(56) References Cited

U.S. PATENT DOCUMENTS

| | | | |
|---|---|---|---|
| 7,430,257 B1* | 9/2008 | Shattil | 375/347 |
| 2003/0232601 A1* | 12/2003 | Uno | 455/67.11 |
| 2004/0066740 A1* | 4/2004 | Suh et al. | 370/210 |
| 2005/0232336 A1 | 10/2005 | Balakrishnan et al. | |
| 2006/0188003 A1* | 8/2006 | Larsson | 375/130 |

FOREIGN PATENT DOCUMENTS

| | | |
|---|---|---|
| EP | 1566936 A1 | 8/2005 |
| GB | 2346520 A | 9/2000 |
| WO | 9740608 A1 | 10/1997 |

OTHER PUBLICATIONS

Sinja Brandes, Reductin of Out-of-Band Radiation in OFDM Based Overlay Systems, Aug. 11, 2005, New Frontiers in Dynamic Spectrum Access Networks, IEEE.*
Brandes et al., Reduction of out-of-Band radiation in OFDM Based Overlay Systems, Nov. 2005, IEEE.*
Brande et al., Reduction of out of Band radiation in OFDM Based Overlay Systems, 2005, IEEE.*
Yamaguchi, H "Active Interference Cancellation Technique for MB-OFDM Cognitive Radio" 34TH European Microwave Conference, 2004. Amsterdam, The Netherlands. Oct. 13, 2004, pp. 1105-1108.
Chiang, J; et al "Use of Cognitive Radio Techniques for OFDM Ultrawideband Coexistence With WIMAX" WNCG Hosts 2005 Texas Wireless Symposium, Oct. 26, 2005, pp. 91-95.

(Continued)

*Primary Examiner* — David C. Payne
*Assistant Examiner* — Wednel Cadeau

(57) ABSTRACT

A system, device and method are described for suppressing certain sub-carrier frequencies within a multi-path transmission system and efficiently notifying a receiver (400) of the suppressed sub-carriers. In various embodiments of the invention, an OFDM system uses the preamble (210) of an OFDM burst for indicating which sub-carrier frequencies are being suppressed by a transmitter (300).

20 Claims, 4 Drawing Sheets

OTHER PUBLICATIONS

Bingham, J. A. C. "RFI Suppression in Multicarrier Transmission Systems" Global Telecommunications Conference, 1996. Globecom '96. Communications: The Key to Global Prosperity London, UK; vol. 2, Nov. 1996, pp. 1026-1030.

* cited by examiner

OFDM COGNITIVE RADIO WITH ZERO OVERHEAD SIGNALLING OF DELETED SUBCARRIERS FREQUENCIES

The present invention relates generally to wireless communication technology, and more particularly, to adaptive interference avoidance within a wireless multi-path transmission scheme.

The importance of wireless communication and its application to numerous different markets is well understood. Wireless technology and devices are continually being improved to include new features and functionality that enables a user to communicate, both voice and data, more effectively.

Wireless devices may communicate with each other in both a point-to-point connection or on a networked connection, such as a WLAN. A WLAN access point operates as a gateway on a network and allows the wireless device to communicate with other devices on the network. This communication oftentimes requires that the communication channel between the devices conform to a particular standard of communication, such as the IEEE 802.11 standards. In order to establish a communication channel, the wireless device and/or access point analyze the channel in order to define certain communication characteristics.

This communication channel may employ orthogonal frequency division multiplexing ("OFDM") which transmits data over a number of different sub-carriers within the channel. OFDM systems are typically characterized as having high spectral efficiency and good resiliency to RF interference. OFDM transmitters are typically able to "switch off" certain sub-carrier frequencies that may potentially interfere with frequencies used by other local devices and systems. This adaptive switching off of potentially interfering sub-carrier frequencies is known as "detect and avoid" and allows co-existing wireless communication systems to operate within overlapping licensed frequency spectrums.

An OFDM receiver may not be aware the suppression of certain sub-carrier frequencies and may function as if the suppressed sub-carriers are active. In such a scenario, the OFDM receiver inappropriately combines noise and/or interference from locations in the channel where the sub-carriers were suppressed with active sub-carriers. As a result, unnecessary noise is added to the OFDM signal by the receiver.

A system, apparatus and method are described for suppressing certain sub-carrier frequencies within a multi-path transmission system and efficiently notifying a receiver of the suppressed sub-carriers. In various embodiments of the invention, an OFDM system uses the preamble of an OFDM burst for indicating which sub-carrier frequencies are being suppressed by a transmitter. In particular, certain symbol frequencies embedded within a preamble of a burst that are typically used for channel estimation are nulled resulting in frequency notches within the preamble. These preamble notches correspond to suppressed sub-carrier frequencies within the payload of the burst or frame, which allow a receiver to efficiently decode and further process the burst accordingly.

In various embodiments of the invention, a receiver or detector module is provided that detects certain sub-carrier frequencies for which data transmission is not preferred. These sub-carriers may be in use by other competing wireless devices or otherwise have too much interference. The associated transmitter will therefore avoid using those particular sub-carriers. A preamble generator generates a preamble having notches associated with these sub-carriers that are to be suppressed. The structure of the notches may be improved by providing guard sub-carriers that provide active interference cancellation to reduce the amount of energy that spills into a notch from adjacent frequencies.

In various embodiments of the invention, a receiver module is provided that performs channel estimation, preamble analysis and signal decoding. A signal is received on a frequency-selective fading channel and channel estimation is performed. The preamble of a burst or frame is analyzed to identify notched frequencies. Erasures in the soft decision bits, associated with the identified notched sub-carrier frequencies, are inserted to avoid corruption of subsequent decoding processes at the receiver. The frame or burst is decoded with the knowledge of the suppressed sub-carrier frequencies and inserted erasures therein. In one embodiment of the invention, a priori knowledge that active interference tones are located adjacent to nulled sub-carrier frequencies is used in the processing of the frame.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

Reference will be made to embodiments of the invention, examples of which may be illustrated in the accompanying figures. These figures are intended to be illustrative, to not limiting. Although the invention is generally described in the context of these embodiments, it should be understood that it is not intended to limit the scope of the invention to these particular embodiments.

FIG. ("FIG.") 1 is an illustration of various OFDM channels including an access point with which a wireless device may communicate according to various embodiments of the invention.

A system, device and method are described for suppressing certain sub-carrier frequencies within a multi-path transmission system and efficiently notifying a receiver of the suppressed sub-carriers. In various embodiments of the invention, an OFDM system uses the preamble of an OFDM burst for indicating which sub-carrier frequencies are being suppressed by a transmitter.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be incorporated in a number of different wireless devices to including wireless access points, wireless routers, cellular phones, smart phones and PDAs. The present invention may be integrated within these wireless devices as hardware, software or firmware. Accordingly, structures and devices shown below in block diagram are illustrative of specific embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment", "another embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. System Overview

Figure 1:
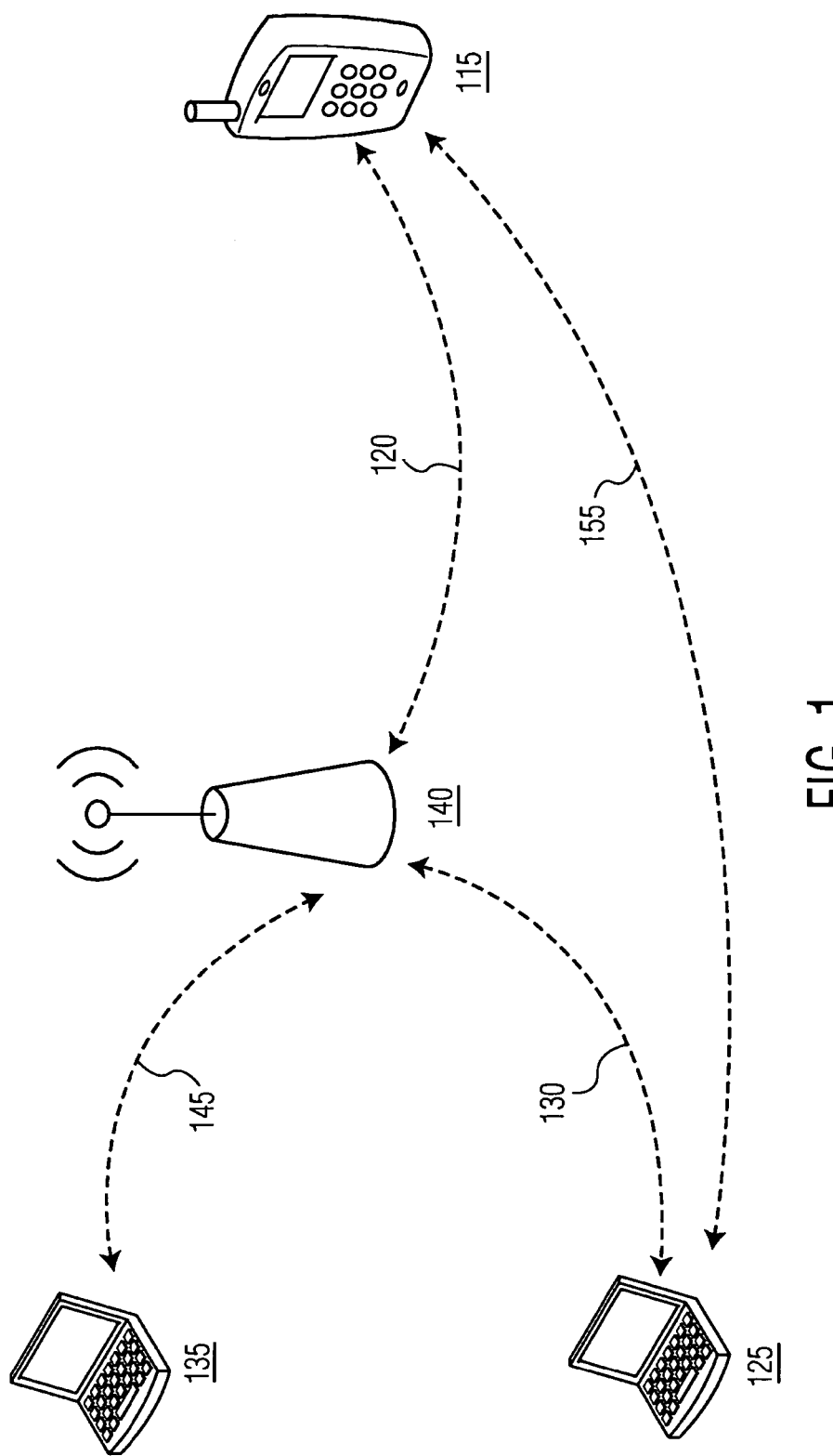

FIG. 1 illustrates an exemplary WLAN, having an access point, in which a plurality of wireless devices may communicate. The WLAN includes a wireless access point 140, a plurality of network stations which may include computers 125, 135 and a mobile wireless device 115 such as a cellular telephone. The wireless access point 140 may include a network switch or router.

The wireless access point 140 and other devices 115, 125, 135 communicate with each other using wireless multi-path channels 120, 130, 145, 155 such as OFDM channels. An OFDM channel is a multi-carrier channel in which data is transmitted on multiple, orthogonal frequencies. The signal structure within these channels 120, 130, 145 may be adjusted according to the environment and channel characteristics in which the communication is to occur. For example, a certain communication channel may have certain sub-carrier frequencies that are being used by another device. Other factors may also be present that would render certain sub-carrier frequencies inoperable within one or more multi-carrier channels.

In various embodiments of the invention, certain burst OFDM transmissions between the devices 115, 125, 135, 140 contain notches within the preamble that are identical to notches that will be used for the burst transmissions of corresponding payloads. A transceiver identifies which sub-carrier frequencies are to be suppressed using an analysis of the energy or estimated signal to noise ratio of each of the sub-carriers within the multi-carrier channel(s). A receiver is able to identify suppressed sub-carriers by analyzing the sub-carrier frequency profile within the preamble burst.

Figure 2:
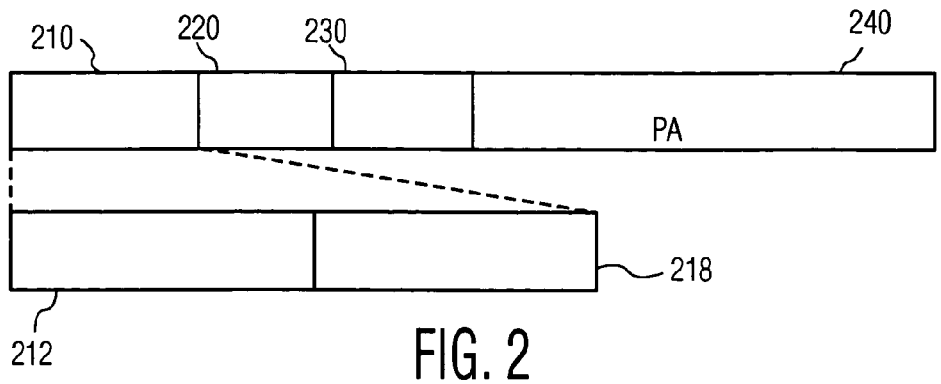
FIG. 2 is a diagram of an OFDM frame or burst structure according to various embodiments of the invention.

FIG. 2 illustrates an exemplary frame or burst structure that may be communicated within an OFDM channel according to various embodiments of the invention. The signal structure includes a Physical Layer Convergence Procedure ("PLCP") preamble 210, a PHY header 220, a MAC header 230, and the frame payload 240. The PLCP preamble 210 contains channel estimation symbols including both time domain preamble symbols 212 and frequency domain preamble symbols 218. The time domain preamble symbols 212 are used for burst synchronization and the frequency domain preamble symbols 218 are used to optimize frequency domain channel estimation.

The frequency domain symbols 218 are created by taking the Inverse Fast Fourier Transform ("IFFT") of a pre-defined set of symbols of unit amplitude and random polarity. At a receiver, a first order channel estimation is performed by taking a Fast Fourier Transform ("FFT") of the relevant segments of the received preamble and inverting the sign of the frequency bins that were transmitted with negative polarity. This channel estimation may be improved by averaging estimates from success channel estimation symbols and applying various filtering strategies related to coherence bandwidth of the channel.

According to various embodiments, the preamble 210, including both the spectrum for the time domain preamble symbols 212 and the spectrum for the frequency domain preamble symbols 218, of the signal structure is notched using known FFT techniques within the art. This notching of the preamble 210 corresponds to notches that will be present in the payload 240 of the burst. In certain embodiments of the invention, both the time domain preamble symbols 212 and the frequency domain preamble symbols 218 are processed in the frequency domain so that these notches may be inserted. These notches may be created by omitting the particular tones within the frequency spectrum or by active interference cancellation. As a result, a receiver is able to identify nulled frequencies or notches within the frame payload 240 by analyzing the notches within the PLCP preamble 210.

B. Preamble Generation and Analysis

Figure 3:
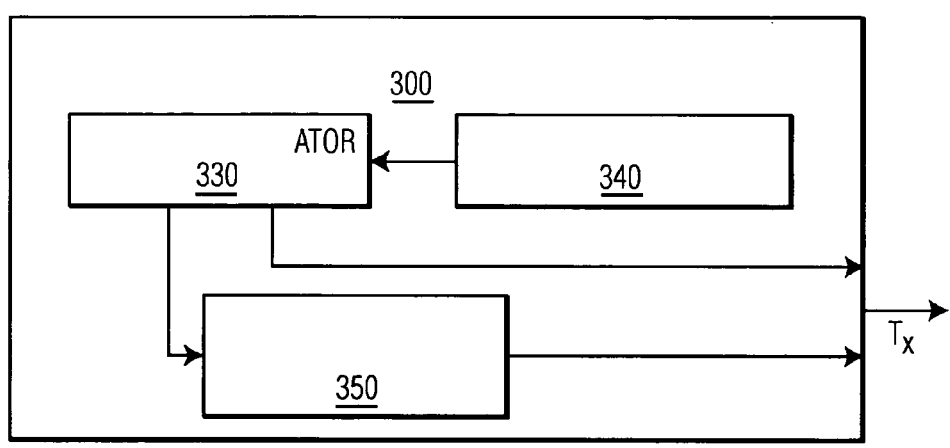
FIG. 3 is a block diagram of a transmitter preamble generator module according to various embodiments of the invention.

FIG. 3 illustrates an exemplary transmitter module 300 in which certain sub-carriers within a preamble are nulled so that a receiver can identify corresponding notches within the frame payload according to various embodiments of the invention. An interference detector 340 is provided that analyzes a frequency spectrum to identify one or more sub-carrier frequencies within an OFDM channel frequency profile, which are not desirable for use. As previously discussed, these undesired sub-carrier frequencies may be in use by another competing device or otherwise contain too much interference. The interference detector 340 provides these undesirable sub-carrier frequencies to a preamble generator 330 for subsequent processing.

The preamble generator 330 generates a notched preamble depending on which sub-carrier frequencies were identified as undesirable by the interference detector 340. As discussed above, this notched preamble may be created by processing both the time domain preamble symbols 212 and frequency domain preamble symbols 218 within the frequency domain and nulling the particular sub-carrier frequencies. In various embodiments of the invention, frequency domain sub-carriers are nulled by inserting zero values where otherwise unit power sub-carriers would be transmitted. This notched preamble is then inserted within a burst or frame and transmitted into the frequency-selective OFDM channel.

An active interference cancellation module 350 is communicatively coupled to the preamble generator 330 so that guard sub-carriers may be generated for each of the frequency notches. These guard sub-carriers may optionally be used to enhance null regions at frequency notches within the preamble by suppressing adjacent interference to the frequency notches.

Figure 5A:
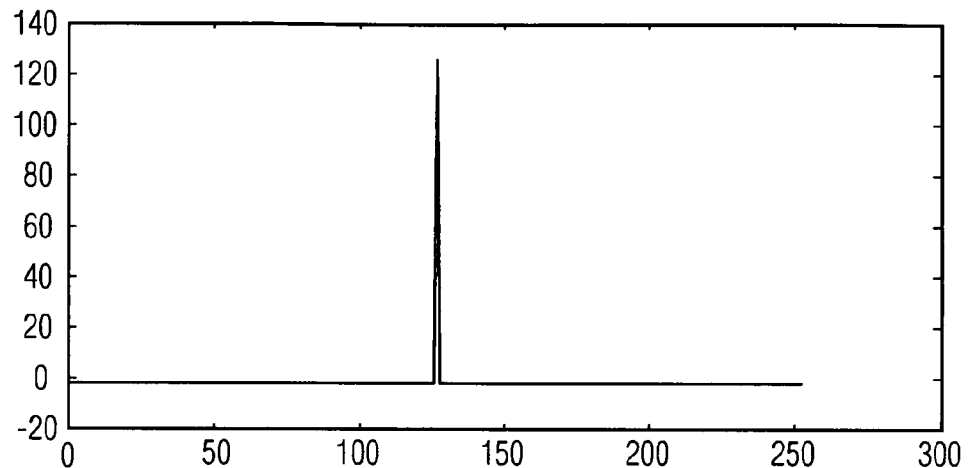
FIG. 5A is an exemplary autocorrelation function plot of an ideal OFDM impulse according to various embodiments of the invention.
Figure 5B:
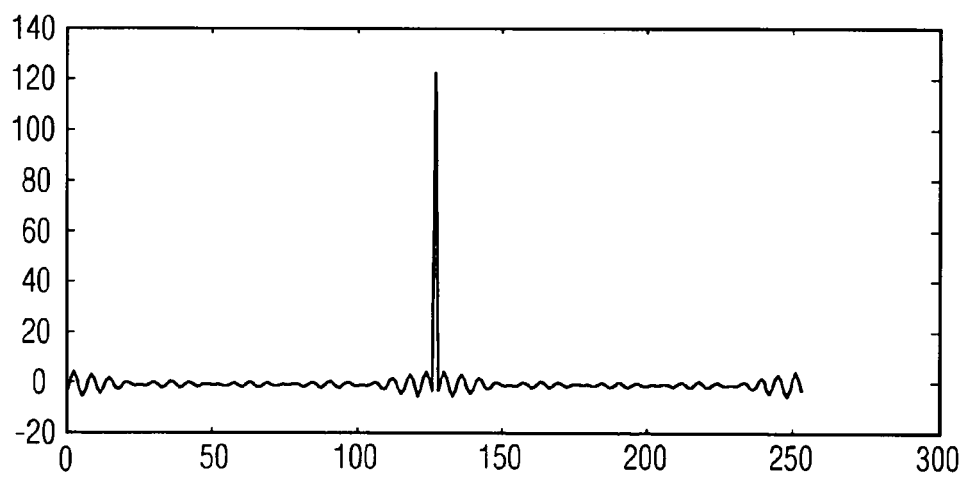
FIG. 5B is an exemplary autocorrelation function plot with notched sub-carrier frequencies within the OFDM impulse according to various embodiments of the invention.

FIGS. 5A and 5B illustrate examples of this active interference cancellation effects on channel characteristics. FIG. 5A is a plot of an autocorrelation function for a pseudo noise ("PN") code of length 127. One skilled in the art will recognize that it is a perfect autocorrelation function and contains an ideal impulse. However, a plot of the autocorrelation function changes as certain sub-carrier frequencies are notched within the channel frequency profile. Specifically, sidelobes on the impulse are generated by the notched sub-carrier frequencies in the frequency profile. FIG. 5B illustrates an example of such an autocorrelation plot in which the same PN code of length 127 is used, but tones 20-25 have been notched. Because the spectrum is no longer white (due to notching), it is clear that the autocorrelation is no longer an ideal impulse. Providing the notching is limited in scope, the quality of the autocorrelation function may not be so severely impacted, and burst timing recovery may not suffer such a significantly reduced performance.

Interference mitigation techniques may be employed that reduce the effects of the notched frequencies which may include the adjustment of the amplitude and phase characteristics of the guard sub-carriers to minimize the amount of energy spilling over into the adjacent notches. The actual values of the guard sub-carriers' amplitude and phase depends on both the channel characteristics and data being sent in the channel in order to effectively cancel this undesired energy spill-over.

The resulting notched sub-carrier frequencies from the preamble generator 330 and the notch guard sub-carrier frequencies from the AIC calculation module 350 are inserted within the frame or burst preamble, which in turn is inserted within the frame or burst. The frame is transmitted onto a frequency-selective fading channel and received at a receiver.

Figure 4:
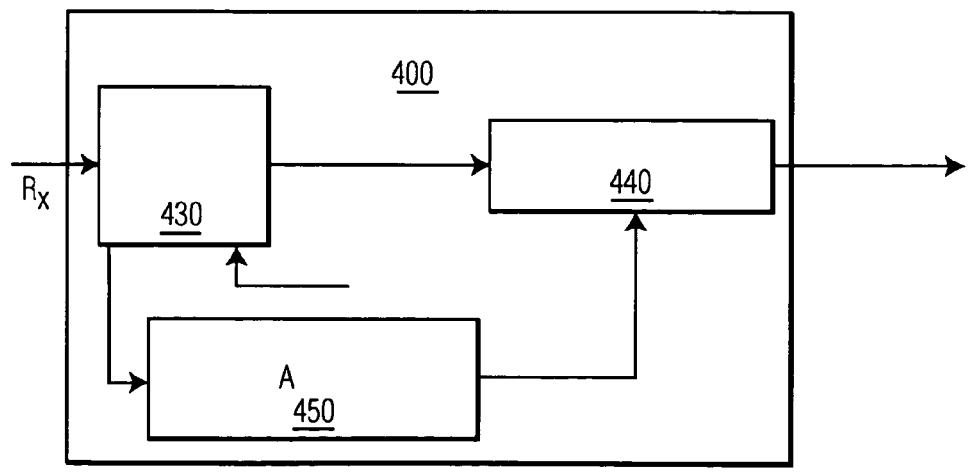
FIG. 4 is a block diagram of a receiver preamble analysis module according to various embodiments of the invention.

FIG. 4 is a block diagram of a receiver module 400, located at a receiver, according to various embodiments of the invention. A channel estimation module 430 receives an OFDM burst and analyzes the burst preamble during channel estimation and synchronization of the burst. The channel estimation module 430 applies an FFT to the received preamble in order to convert the preamble into the frequency domain. In the frequency domain, the channel estimation module 430 identifies notched frequency sub-carriers within the preamble of the burst.

According to various embodiments of the invention, the channel estimation module 430 processes frequency domain samples from the preamble which are formed by the following product:

$$X(i)=H(i) \cdot R(i) \cdot M(i),$$

where $H(i)$ is the $i^{th}$ frequency domain complex channel tap, $M(i)$ is $i^{th}$ sample of the frequency domain mask used at the transmitter to define the transmitted notch, and $R(i)$ is the $i^{th}$ reference channel estimation sub-carrier symbol, $R(i) \in [-1,1]$ and $M(i) \in [0,1]$.

The channel estimation for the $i^{th}$ sub-carrier is given by $$X_{CE}(i)=H(i) \cdot X(i),$$

since $R(i) \cdot R(i)=1$ for all i.

In various embodiments of the invention, an application of a threshold to each of the sub-carrier frequencies within the channel spectrum identifies which frequencies have been nulled within the preamble. If the energy or voltage level of a particular frequency or frequency band falls below this threshold, then that frequency or frequency band is designated as a nulled sub-carrier frequency.

Once the nulled sub-carrier frequencies are identified within the receiver, erasures are inserted within the soft decision bits associated with the identified sub-carriers by either applying a threshold decision criterion or by applying a maximal ratio combing so as to provide a very low confidence level to the impacted bits. By inserting these erasures or zeroes within the soft bits associated with the nulled frequencies, the forward error correction decoding processes won't become polluted by the notches created at the transmitter. Maximal ratio combining is achieved in the receiver if the individual sub-carriers are appropriately weighted, which may be achieved using element-by-element multiplication by the complex conjugate of the channel estimation vector $X_{CE}$ resulting in:

$$X_{MRC}(i)=X_{RX}(i) \cdot X^*_{CE}(i),$$

where $X_{RX}(i)$ is the $i^{th}$ sub-carrier in any given received payload OFDM symbol. It should be noted that this application of MRC weighting, using the complex conjugate of the channel estimate can be said to have implicitly created erasures for the received sub-carriers corresponding to null transmissions. In the case where the channel estimate is ideal, no further processing need be done. In practical cases, the channel estimation may not provide perfect zeros corresponding to the nulled sub-carriers and it may therefore be beneficial to make a hard decision on which sub-carriers have been nulled and apply corresponding explicit erasure insertions. The latter case is described in the following paragraph.

The identified sub-carrier frequencies within the burst preamble are forwarded to a nulled frequency identification and list module 450 for further processing and storage. The nulled sub-carrier frequencies within the preamble are stored within the nulled frequency identification and list module 450 so that corresponding notches within the payload burst may be identified. In one embodiment, a map or table is generated and stored that associates identified notches within the burst preamble to the notches within the burst payload, and erasures are inserted therein.

The identification of particular sub-carrier frequencies are provided to a channel decoder 440 so that the decoder is aware of the notched frequencies having the erasures within the payload. The frame, including the frame payload, is decoded and transmitted to the processor or MAC for further processing.

Figure 6A:
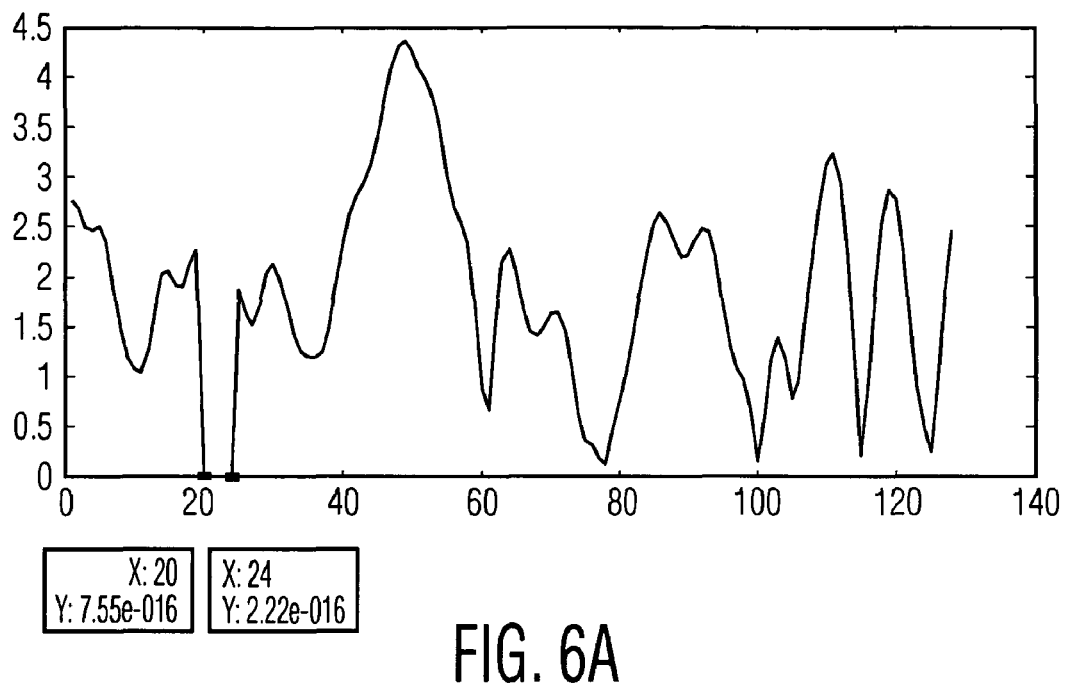
FIG. 6A is a plot showing magnitude channel estimations for each sub-carrier frequency within an OFDM channel according to various embodiments of the invention.
Figure 6B:
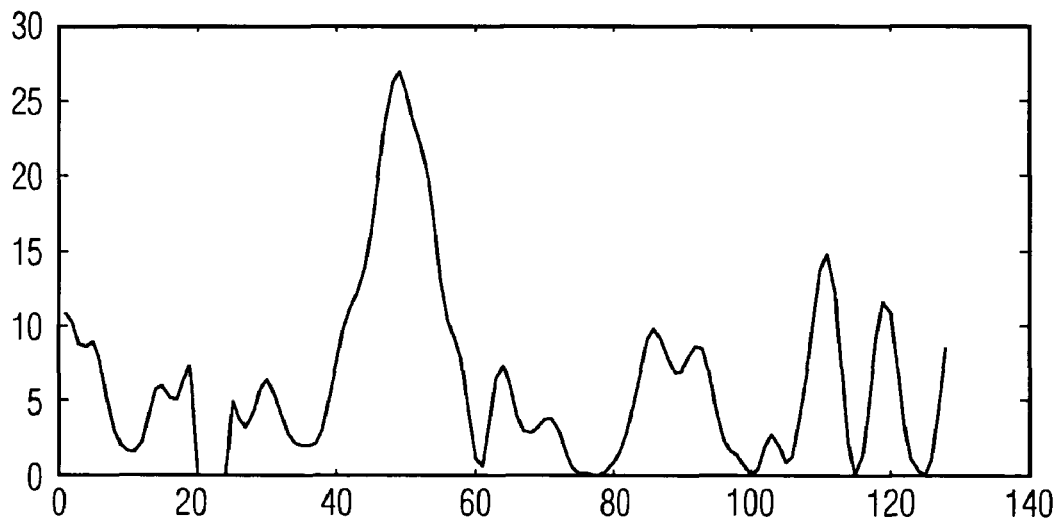
FIG. 6B is a plot showing MRC weighted QPSK symbols at a receiver according to various embodiments of the invention.

FIGS. 6A and 6B are representative plots of channels estimation vectors and associated received QPSK symbols. FIG. 6A shows magnitudes of 128 channel taps within an OFDM channel. One skilled in that art will recognize that sub-carriers 20-24 are estimated as zero or very close to zero and represent nulled sub-carrier frequencies.

FIG. 6B shows the magnitude of received QPSK symbols which have been weighted with the complex conjugate of the channel tap estimates. A large magnitude represents a high confidence soft decision, whereas a value of zero represents zero confidence or an erasure for channel decoding. As is apparent from this plot, nulled sub-carriers at frequencies 20-24, 77-78, 100, 115, and 125 are shown as zero or very close to zero. The weighting of the symbols effectively removes energy at sub-carriers 77-78, 100, 115, and 125 so that they are more representative of zero confidence or an erasure.

While the present invention has been described with reference to certain embodiments, those skilled in the art will recognize that various modifications may be provided. Variations upon and modifications to the embodiments are provided for by the present invention, which is limited only by the following claims.

What is claimed is:

1. A method for suppressing at least one sub-carrier frequency within a channel frequency profile, the method comprising:
   identifying the at least one sub-carrier frequency, within the wireless channel frequency profile, having an interference level above a first threshold;
   notching the at least one sub-carrier frequency in a preamble of a burst to generate a notched preamble;
   transmitting the burst, comprising the notched preamble and a payload, into a wireless channel;

receiving the burst from the wireless channel and analyzing the notched preamble to identify the at least one sub-carrier frequency;

inserting at least one erasure in the payload of the burst at the at least one sub-carrier frequency identified by analyzing the notched preamble; and decoding the payload of the burst.

2. The method of claim 1 wherein the wireless channel is a frequency-selective fading OFDM channel.

3. The method of claim 1 further comprising: providing a first guard sub-carrier, adjacent to the at least one notched sub-carrier frequency, that reduces energy from spilling into the at least one notched sub-carrier frequency; and providing a second guard sub-carrier, adjacent to the at least one notched sub-carrier frequency, that reduces energy from spilling into the at least one notched sub-carrier frequency.

4. The method of claim 3 wherein the first and second guard sub-carriers use active interference cancellation to reduce energy from spilling into the at least one notched sub-carrier frequency.

5. The method of claim 1 wherein the at least one notched sub-carrier frequency in the burst preamble is identical to the at least one suppressed sub-carrier frequency in the burst payload.

6. The method of claim 1 wherein the at least one sub-carrier frequency is notched by applying a frequency domain nulling mask to channel estimation symbols associated within the at least one sub-carrier frequency.

7. The method of claim 6 wherein sub-carrier frequencies within the received burst are weighted by complex conjugates of channel estimation symbols that implicitly contain the frequency domain nulling mask.

8. The method of claim 1 wherein sub-carrier frequencies within the received burst are compared to a threshold level to determine whether a frequency notch is present.

9. A transmitter module apparatus located within a multi-frequency wireless transmitter, the module comprising:

an interference detector, coupled to an antenna, that analyzes frequency characteristics within a frequency spectrum and identifies undesirable sub-carrier frequencies within the frequency spectrum;

a preamble generator, communicatively coupled to the interference detector, that generates a notched preamble having at least one sub-carrier frequency notch corresponding to the identified undesirable frequencies, wherein the notched preamble is configured to instruct a receiver to insert at least one erasure in a payload of a burst at least one of the undesirable sub-carrier frequencies; and an active interference cancellation module, communicatively coupled to the interference detector, that generates sub-carrier guards that are adjacent to the at least one sub-carrier frequency notch to reduce energy from spilling into the at least one sub-carrier frequency notch.

10. The transmitter module apparatus of claim 9 wherein the at least one sub-carrier frequency notch and the sub-carrier guards are combined within the preamble of a burst and transmitted into a wireless channel.

11. The transmitter module apparatus of claim 9 wherein the at least one sub-carrier frequency notch in the preamble of a burst is identical to at least one suppressed frequency in a payload of the burst.

12. The transmitter module apparatus of claim 9 wherein the sub-carrier guards reduce energy spillover by active interference cancellation.

13. The transmitter module apparatus of claim 9 wherein the interference detector identifies the undesirable sub-carrier frequencies based on a signal-to-noise ratio analysis of frequencies within the frequency spectrum.

14. A receiver module apparatus located within a multi-frequency wireless transmitter, the module comprising:

a channel estimation module, coupled to receive a burst from a wireless channel, that analyzes a notched preamble to identify at least one notched sub-carrier frequency within the notched preamble of the burst;

a nulled sub-carrier identification and list module, coupled to the channel estimation module, that stores the at least one notched sub-carrier frequency identified by the channel estimation module; and a channel decoder, coupled to the channel estimation module and the nulled sub-carrier identification and list module, that associates at least one suppressed sub-carrier frequency within a payload of the burst with the at least one notched sub-carrier frequency in the notched preamble, and decodes the notched preamble.

15. The receiver module apparatus of claim 14 wherein the channel estimation module inserts at least one erasure in the at least one suppressed sub-carrier frequency within the payload.

16. The receiver module apparatus of claim 14 wherein a threshold is applied to symbol frequencies within the preamble to identify the at least one notched sub-carrier frequency.

17. The receiver module apparatus of claim 14 wherein a priori knowledge of guard sub-carriers is used to identify the at least one notched sub-carrier frequency within the preamble.

18. The receiver module apparatus of claim 14 wherein the nulled sub-carrier identification and list module stores the at least one notched sub-carrier frequency in a table that associates the at least one notched sub-carrier frequency in the preamble to the at least one suppressed sub-carrier in the payload.

19. The receiver module apparatus of claim 14 wherein the channel decoder decodes the payload using forward error correction processes.

20. The receiver module apparatus of claim 14 wherein the at least one sub-carrier frequency is weighted by a complex conjugate of channel estimation symbols containing a frequency domain nulling mask that was applied at a transmitter.

* * * * *